United States Patent [19]

Schacle

[11] 4,408,958
[45] Oct. 11, 1983

[54] WIND TURBINE BLADE

[75] Inventor: Charles V. Schacle, Moses Lake, Wash.

[73] Assignee: The Bendix Corporation, Southfield, Mich.

[21] Appl. No.: 219,467

[22] Filed: Dec. 23, 1980

[51] Int. Cl.³ .............................................. F03D 1/06
[52] U.S. Cl. .................................. 416/237; 416/226; 416/235
[58] Field of Search ................. 416/23, 228, 235, 237, 416/228 A, 242, 243, 226, DIG. 2

[56] References Cited

U.S. PATENT DOCUMENTS

| 1,353,710 | 9/1920 | Baumann | 416/243 X |
| 1,838,453 | 12/1931 | Rosen | 416/237 |
| 1,853,607 | 4/1932 | Ferreby | 416/237 |
| 1,910,520 | 5/1933 | De la Cierva | 416/226 X |
| 2,746,672 | 5/1956 | Doll, Jr. et al. | 416/235 |

FOREIGN PATENT DOCUMENTS

| 269,627 | 10/1927 | Italy | 416/237 |
| 152978 | 2/1932 | Switzerland | 416/237 |
| 14051 | 7/1915 | United Kingdom | 416/243 |

*Primary Examiner*—Harvey C. Hornsby
*Assistant Examiner*—Christine A. Peterson
*Attorney, Agent, or Firm*—Robert C. Smith; W. F. Thornton

[57] ABSTRACT

A wind turbine blade of large size for a wind turbine (14) having three blades (16) and used to generate electrical power is contoured to minimize stalling and to provide unusually good efficiency. The cross section of the blade tapers from a configuration at the hub or inboard end with substantial leading and trailing edge deflection toward the wind providing high lift at low speed, to the outboard one-fourth to one-fifth which is configured as a conventional low lift airfoil since it moves through the air at comparatively high speed. The chord length of approximately the inboard one-third of the blade is chosen such that, in combination with the deflection, very little air is permitted to cross this inboard part of the blade but is forced to flow radially outwardly such that by reason of an increase in dynamic pressure it augments the flow across the faster moving part of the blade. The blade may be formed of a single long tapered spar (34) having great strength which is fastened to the hub with a plurality of ribs (a-i) attached perpendicularly to the spar to define the desired cross-sectional configurations, this assembly being covered with a suitable skin such as a glass epoxy cloth.

11 Claims, 4 Drawing Figures

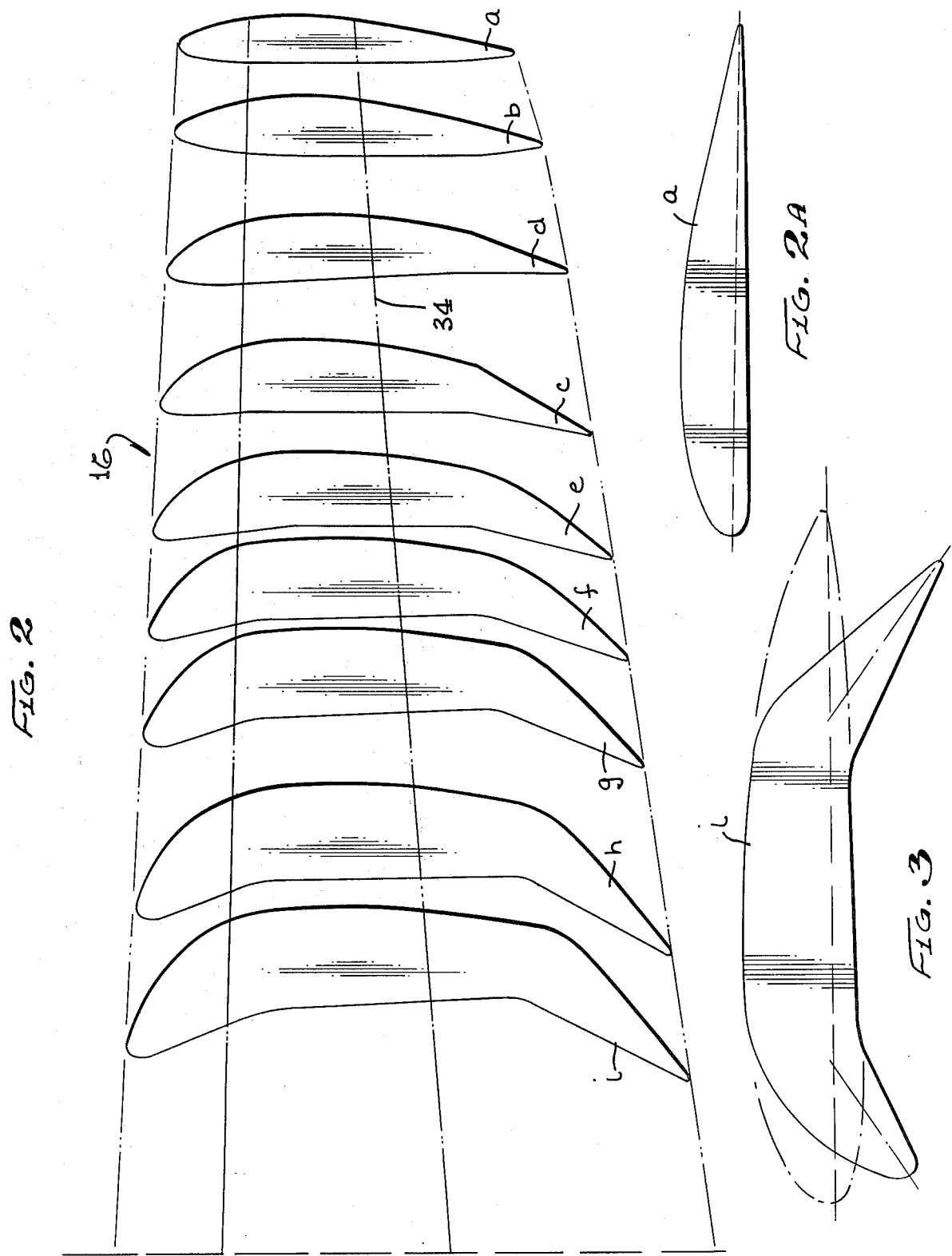

WIND TURBINE BLADE

BACKGROUND OF THE INVENTION

The use of windmills to generate electrical power is well known. Not only windmills but other kinds of wind-driven devices have been used or proposed for generating electrical power. Thousands of small wind-driven generators were in operation in rural areas in the 1930's and 1940's to supply power to farmers before power lines were built. Such systems were of relatively simple construction and included a small generator directly driven by a two-blade propeller of conventional construction having a span of a few feet. Because of widely varying wind velocities, alternating currents would have been of varying frequencies, so the generator was connected to charge a bank of batteries and the power used as direct current. Where it is desired to supply and use alternating current in large quantities, the system becomes much more complex. Since a generator inherently supplies alternating current at a frequency varying with its rotational speed, a number of schemes have been proposed for controlling the feathering of propellers to keep their speed relatively constant, or within a narrow range of speeds such that other means may be used to drive the generator at a constant speed.

Where such windmills are used to generate power in commercial quantities to be supplied to power lines, economic considerations point to efficiencies in building very large windmills of diameters in excess of 40 meters. The large cost of such systems puts a considerable premium on efficiency of the installation. Used in this sense, efficiency refers to the ability of the windmill blade to extract the maximum amount of energy for the range of wind velocities experienced. To do this successfully, the windmill should be structurally capable of withstanding high wind velocities such as in the order of 70-80 kilometers per hour without requiring total feathering and shutdown of the system. It should also include feathering means for protecting the windmill from wind velocities in excess of values determined to be safe for the equipment.

One of the problem areas with windmills having a horizontal shaft is that since the wind blows substantially perpendicular to the direction of blade rotation and impinges on the blades from immediately outboard of the hub to the blade tips, there is a very great difference in blade velocity from one radial position to another. It has long since been determined that windmill blades are, in general, most efficient when constructed with an airfoil-like cross-section. With the differences in velocities along the blade, however, it is almost inevitable that one part of the blade or another will be in a condition of stall. Stalling frequently begins near the root of the blade even when the blade is rotating at relatively high speed. The stall region may then tend to migrate along the blade radially until the blade no longer has sufficient power to carry the load, and the entire blade will then stall. It is known in some designs to put twist in the blade from the hub to to the tip avoid or minimize stalling of the blade. There is, therefore, a need for a windmill blade configuration which is as efficient as possible, which minimizes stalling, and which is rugged and durable enough to operate and thereby generate power at substantial wind velocities and resulting high rotational speeds.

SUMMARY OF THE INVENTION

Applicant has designed a blade for a wind turbine which has considerable strength, which is efficient, and which provides the desired degree of lift along its entire length from the portion nearest its hub to its tip. At the inside or root end of the blade where it adjoins the hub, the blade is quite wide and has a cross section which is designed to provide a high lift at low speed. At the outside end, the blade tapers to a minimum thickness and length and has a low lift cross section similar to that of a typical stationary airplane wing which allows a maximum lift coefficient of about 1.25 to 1.5 before stall occurs. This low lift section extends over approximately the outboard one-fifth of the blade. From the root to this point, approximately one-fifth of the way from the outside end, the blade tapers smoothly from the maximum high lift configuration to the low lift cross section described above. The point at which the transition to a conventional low lift cross section occurs is subject to some variation depending upon the size and normal operating speed of the wind turbine with the transitions desirably occurring at the radius at which air speed does not exceed about 240 kph. The described high lift configuration may be similar to that observed in a large aircraft when it is about to land and has its flaps at maximum deflection and (sometimes) slots deflected, thereby allowing high aerodynamic anges of attach which provide a maximum lift coefficient near the hub of approximately 3.0 before stall occurs. The exact angular downward deflection of the leading edge contour which is similar to slots is significant but is of less importance than the greater deflection at the trailing edge. In the case of the windmill blade and using long known principles of lifting bodies, the deflection is outwardly, toward the wind, such that the wind is deflected by the blade first in a direction generally parallel to the surface of the blade and then is deflected by the trailing edge back toward its source and only turns back again toward its original direction in time to again be deflected by the next blade coming around. Very little air actually flows across the blade near its root and over a circle whose radius is about one-third of the length of the blade, but due to less inertia and thereby less resistance of the moving air mass envelope outside the blade periphery, this air tends to move outwardly along the blade before it flows across. In this way a substantial pressure differential is maintained across the inboard portion of the blade, and the air which would otherwise flow across this portion adds adds increased dynamic pressure to that flowing across the outer portion where the velocity is much higher, thus adding the blade's overall efficiency.

DESCRIPTION OF THE DRAWINGS

FIG. 2 is a diagrammatic view of one of the turbine blades of FIG. 1 with a number of cross sections shown turned 90 degrees.

FIG. 2a is an enlarged view of one of the cross sections shown in FIG. 2.

FIG. 3 is an enlarged view of another of the cross sections shown on FIG. 2.

DESCRIPTION OF THE PREFERRED EMODIMENT

Figure 1:
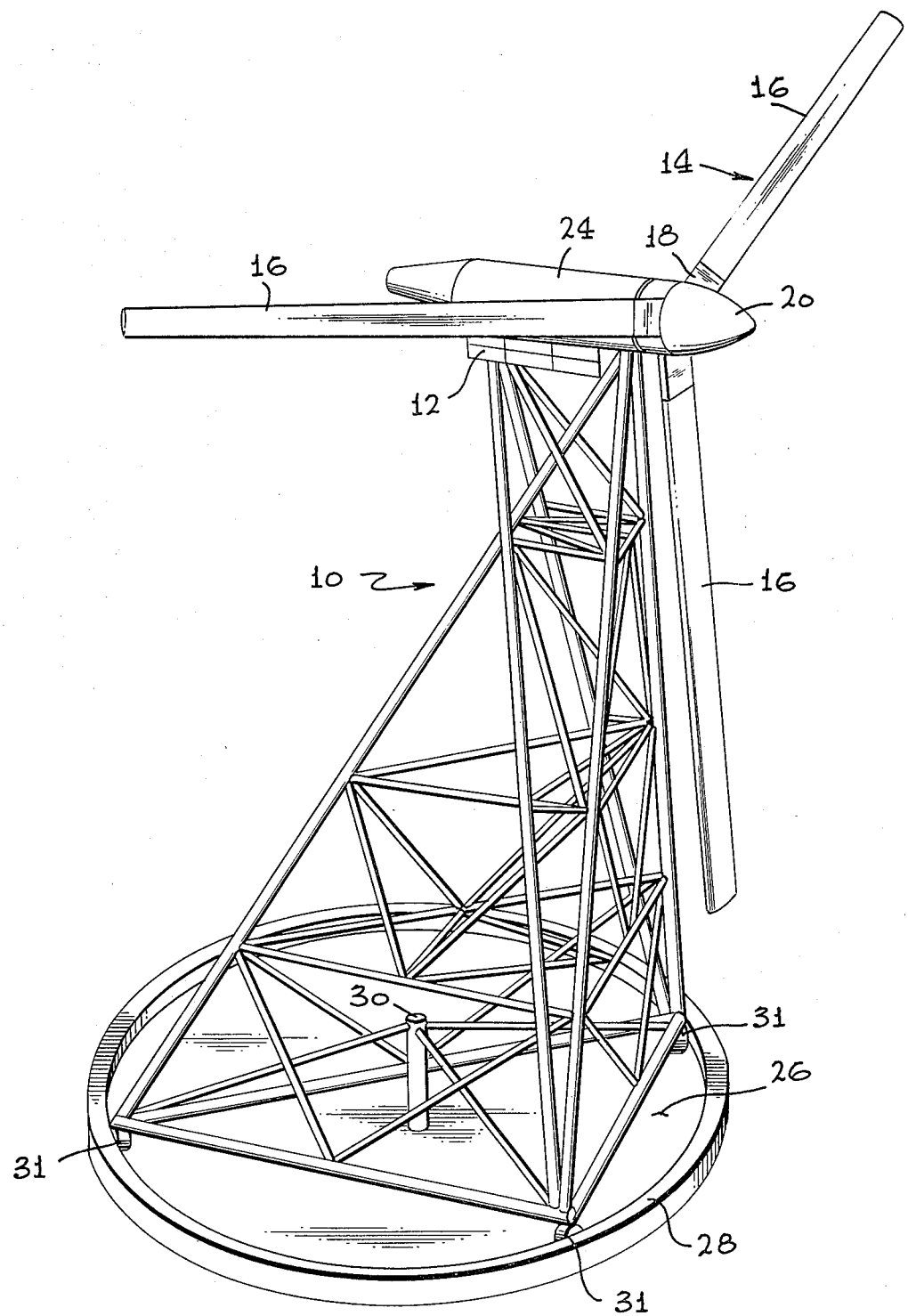
FIG. 1 is a perspective view illustrating a wind turbine supported on a tower having turbine blades made according to this invention.

Referring to FIG. 1, a wind turbine includes an upright tower 10 supporting a platform 12 in a horizontal position above the tower. The platform is rigidly affixed to the top of the tower. A propeller 14 is supported on the tower adjacent the platform. The propeller has three radially extending blades 16 spaced apart equidistantly about a horizontal axis of rotation. The propeller includes a variable pitch propeller hub cowling 18 capped by a streamline nose 20. A root fairing 22 for each propeller blade couples into the hub. The propeller blades extend in a vertical plane adjacent the side of the tower, and the blades are relatively long, extending for a major portion of the height of the tower.

The propeller is coupled to rotating machinery supported on the platform 12. A skin 24 encompasses portions of a generator system, propeller feather control components, and associated framework, all mounted on the platform. These portions are described in greater detail in a copending application, Ser. No. 42,496, in which the present applicant is named as a coinventor, and they include a torque tube, hydraulic cylinder, gear box, motors, and attendant line and control circuitry.

The tower is mounted on a flat base 26. A circular track 28 at the periphery of the base guides the path of the tower as it rotates about a vertical axis through a pivot 30. Rollers 31 support the bottom of the tower for rotation on the base. The propeller blades rotate about the horizontal axis in response to the wind acting on the propeller. As the propeller rotates about its axis, the entire tower rotates about the vertical axis through the pivot 30 to constantly maintain the propeller upwind of the tower.

FIG. 2 is a diagrammatic view of a turbine blade made according to my invention with a number of cross sections shown turned 90 degrees to aid in understanding the detailed configuration of the blade. In this view the blade 16 is shown somewhat foreshortened with the scale as to blade width larger than its length. The blade structure may be formed of various materials including wood or metal or a combination covered with a suitable skin which may be of glass epoxy cloth or thin metal. Where the spar and ribs are of wood, the blade has been covered with a glass fiber fabric. The blade is formed of a main spar 34 attached by suitable means to a hub on the center line of the turbine to which is attached a large number of rib members defining the shape of the blade. The main spar could be of metal such as steel even if the rib members are of wood. Since the cross section varies substantially from the root end of the blade to the tip, these ribs have substantially different shapes. For the purpose of this description it will be presumed that a rib is located at each of the cross sections shown, although this may in practice not be quite true. There will normally be many more ribs than are shown in FIG. 2. For a 25-meter blade, normal practice would call for a rib approximately every 38 centimeters.

From FIG. 2 it will be observed that the cross sections a and b shown at the outward or tip end of the blade are in the form of conventional air foils like that of an airplane wing having a relatively low maximum lift coefficient of 1.25 to 1.5 before stalling and a relatively low angle of attack for maximum lift. The dashed line shown extending directly across the widest dimension of rib section a defines the chord of the blade at this point. See enlarged view, FIG. 2a. Section c is of slightly different shape from section b and represents a transition from a conventional air foil shape to a higher lift configuration. Section i which is nearest the hub is, of course, located at the point on the blade having the least velocity through the air. Parts of the blade farther from the hub have correspondingly greater velocities with maximum blade velocity at the tip. To minimize stalling of the blade, those parts having the least velocity at normal rotational speeds are formed of a high lift cross section (producing a maximum lift coefficient before stalling of 3.0) which is similar to the cross section of an airplane wing with both trailing edge flaps and leading edge slots deflected a maximum amount. As will be seen, this is the configuration of section i, shown enlarged in FIG. 3. Where applicant refers to an "airfoil" or an "airfoil-like" configuration, a cross-section like that of a typical airplane wing is meant where the leading edge is well rounded, one surface is curved more than the other, and both surfaces come together at a fairly sharp trailing edge, as shown in FIG. 2A.

In this enlarged view of section i, the cross section is shown with a dashed outline defining the configuration of the airfoil if it were conventional (like section a) and not deflected. The chord line is shown extending across this conventional section and also as it is rotated in the actual cross section in the deflected leading and trailing edges.

Section h, g, f, e and d have progressively less deflection until at about one-fifth of the distance from the tip, the ribs are not formed with deflection but are like conventional aircraft air foils which allow a maximum lift coefficient of perhaps 1.25 to 1.5 before stall occurs. The location along the blade where the transition between deflection and no deflection takes place will vary from blade to blade depending upon various operating conditions such as tip speed in normal use, rotational speed of the turbine, etc., but this transition should occur at the location where the velocity of the blade through the air is approximately 240 kph.

Due to relative velocity of the blade rotational speed versus the wind speed, resulting in higher aerodynamics angles of attach at the root area where the wind speed is the same but velocity due to rotation is less, stalling along a propeller blade tends to be progressive, beginning near the root and moving outwardly until ultimately the blade is installed and does not develop significant power. A standard method of avoiding stall is to twist the blade near the root. With the above described configuration, the blade has an effective aerodynamic twist without physical twisting of the blade.

While the above described blade has been described in terms of a particular structure, i.e., an elongated spar with rib members attached perpendicularly thereto to determine the cross-sectional configuration, this arrangement is appropriate to a very large blade, and alternative structure may be suitable as well, particularly where the turbine is of smaller diameter. Certain of the proportions, angles and dimensions named above are exemplary of one existing design involving a blade approximately twenty-seven meters long but are not necessarily critical except where indicated.

I claim:

1. A wind turbine blade, said blade being attached to a hub and comprising a spar structure having an inboard end adjacent said hub and an outboard end, said spar structure being substantial width and thickness at its inboard end and tapering toward its outboard end;

a plurality of rib members attached to said spar structure at intervals, contours of said rib members defining both leading and trailing edges of said blade, and a skin structure covering said spar structure and said rib members;

wherein the improvement comprises forming the said rib member nearest said hub of greatest length of all said rib members and of an assymmetrical airfoil-like configuration with substantial deflection of both leading and trailing edges toward the direction of the wind to provide a high lift cross-section, rib members located at a point along said spar structure substantially over half the distance from said hub to said outboard end and from there to said outboard end are formed of a conventional assymmetrical airfoil configuration having a relatively low maximum lift coefficient and a relatively low angle of attack for maximum lift, and intervening rib members located between said point and the said rib member nearest said hub tapering in cross-section from the high lift cross-section of said rib member nearest said hub through a series of ribs having progressively less width and less deflection of said leading and trailing edges to the conventional airfoil section of the rib member at said point, the length of said rib members including that nearest said hub and those extending at least one-fourth to one-third of the distance outwardly from the hub of said blade being such as to preclude substantial flow of air across said blade over an area whose radius is said distance when said wind turbine is rotating at a normal operating speed.

2. A blade for attachment to the hub of a wind turbine as claimed in claim 1, wherein said rib member nearest said hub has a trailing edge substantially deflected out of the plant of movement of said blade toward the direction of the wind and said intervening rib members have progressively less deflection out to said point.

3. A blade for attachment to the hub of a wind turbine as claimed in claim 2 wherein said rib member nearest said hub has a trailing edge deflection of approximately thirty-eight degrees from the plane of movement of said blade.

4. A blade for attachment to the hub of a wind turbine as claimed in claim 3 wherein said rib member nearest said hub has a leading edge substantially deflected out of the plane of movement of said blade toward the direction of said wind and said intervening rib members have progressively less deflection out to said point.

5. A blade for attachment to the hub of a wind turbine as claimed in claim 4 wherein said rib member nearest said hub has a trailing edge deflection of approximately thirty-five degrees from the plane of movement of said blade.

6. A wind turbine blade, said blade being attached to a hub and comprising a structure having an inboard end adjacent said hub and an outboard end, said blade having substantial width and thickness at its inboard end and tapering toward its ouboard end:

wherein the improvement comprises forming the inboard portion of said blade nearest said hub of the greatest chord length and of an assymmetrical high lift airfoil-like configuration with substantial trailing edge deflection, forming the blade section constituting approximately the outboard one-fifth of the length of said blade of a conventional airfoil configuration having a relatively low maximum lift coefficient and a relatively low angle of attack for maximum lift, and tapering the portion of said blade from said hub to said conventional assymmetrical airfoil section with progressively less chord length and trailing edge deflection, said inboard portion and a length of said tapered section constituting approximately the inboard one-fourth to one-third of the length of said blade having such chord length and deflection as to preclude substantial air flow across said wind turbine over a circle whose radius is described by said inboard one-fourth to one-third of said blade length when said turbine is rotating at a normal operating speed.

7. A blade for attachment to the hub of a wind turbine as claimed in claim 6 wherein said inboard section also has substantial leading edge deflection, with said trailing edge and said leading edge both being deflected toward the direction of the wind, with said leading edge also tapering with progressively less deflection from said inboard section to said conventional assymmetrical airfoil section.

8. A blade for attachment to the hub of a wind turbine as claimed in claim 6 wherein said inboard portion of said blade nearest said hub has a trailing edge deflection of approximately thirty-eight degrees from the plane of movement of said blade.

9. A blade for attachment to the hub of a wind turbine as claimed in claim 7 wherein said inboard portion of said blade nearest said hub has a leading edge deflection of approximately thirty-five degrees from the plane of movement of said blade and said leading edge deflection becomes progressively less with greater distances outboard out to said outboard one-fifth of the length of said blade which has no leading edge deflection.

10. A blade for attachment to the hub of a wind turbine as claimed in claim 6 wherein said outboard one-fifth of said blade tapers both in chord length and thickness toward said outboard end.

11. A blade for attachment to the hub of a wind turbine, said blade comprising a spar structure having an inboard end adjacent said hub and an outboard end, said spar structure including a beam having substantial width and thickness at its inboard end and tapering toward said outboard end;

a plurality of rib members attached to said beam at intervals, contours of said rib members defining both leading and trailing edges of said blade, those ribs extending toward the leading edge of said spar structure being somewhat more rounded and shorter than those extending toward the trailing edge, and a skin structure covering said beam and said rib members;

wherein the improvement comprises forming the said rib members which are nearest said hub of greatest length and wherein the leading edge rib section and the trailing edge rib section both are deflected substantially out of the plane of said beam toward the direction of the driving wind, rib members located at a point along said beam substantially over half the distance from said hub to said outboard end and from there to said outboard end are retained in the plane of said beam to form a conventional assymmetrical airfoil structure, and intervening rib members located between said point and the said members nearest said hub having their leading edge and trailing edge rib sections deflected out of the plane of said beam toward the direction of the driving wind in varying amounts with the greatest deflection nearest said hub and with said intervening rib members having gradually diminishing amounts of deflection as they are located closer to said point, the said rib members nearest said hub and intervening rib members extending over approximately the inboard one-fourth to one-third of the length of said blade having such chord length and deflection as to preclude substantial air flow across said wind turbine over a circle whose radius is described by said inboard one-fourth to one-third of said blade length when said turbine is rotating at a normal operating speed.

* * * * *